Jan. 7, 1958
H. D. SWARTZ
2,819,374
THERMOPLASTIC WELDING DEVICES
Filed Jan. 18, 1956
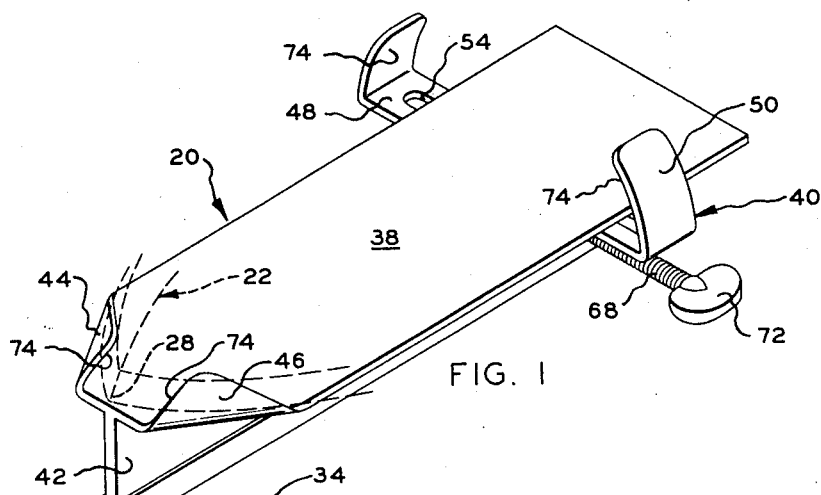
FIG. 1
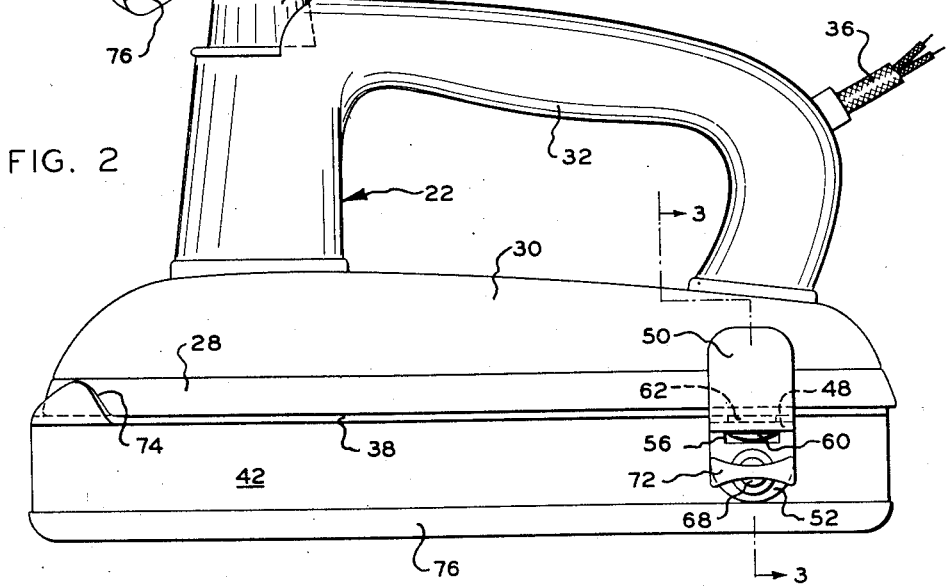
FIG. 2
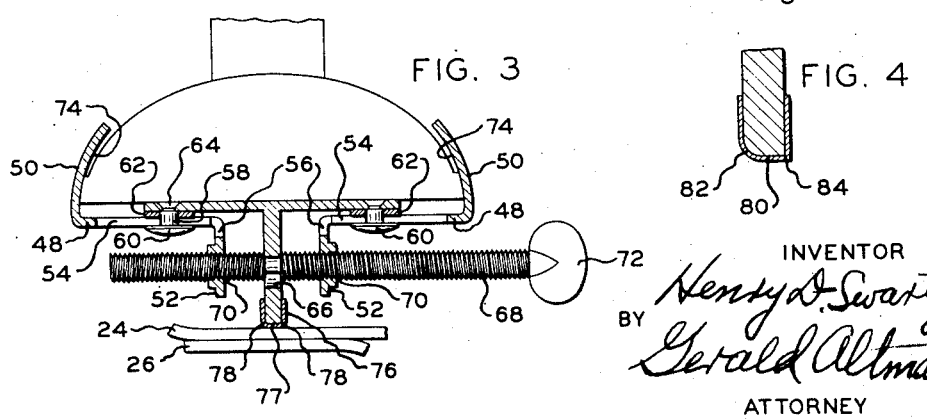
FIG. 3
FIG. 4
INVENTOR
Henry D. Swartz
BY
Gerald Altman
ATTORNEY

United States Patent Office 2,819,374
Patented Jan. 7, 1958

2,819,374

THERMOPLASTIC WELDING DEVICES

Henry D. Swartz, Brookline, Mass.

Application January 18, 1956, Serial No. 559,878

3 Claims. (Cl. 219—25)

The present invention relates to sealing and, more particularly, to devices for joining thermoplastic materials by welding.

The primary object of the present invention is to provide a simple attachment which converts a thermostatically controlled home electric iron into a concentrated source of heat and pressure designed to effectively weld together thermoplastic sheets. The attachment comprises a bed for the base of the iron, a clamp for securing the base to the bed, and such means as a blade for applying heat and pressure, transmitted from the iron and through the bed, to predetermined collocated regions of the thermoplastic sheets.

Other objects of the present invention will in part be obvious and will in part appear hereinafter.

The invention accordingly comprises the device possessing the construction, combination of elements, and arrangement of parts which are exemplified in the following detailed disclosure and the scope of which will be indicated in the appended claims.

For a fuller understanding of the nature and objects of the present invention, reference should be had to the following detailed description taken in connection with the accompanying drawing wherein:

Fig. 1 is a perspective view of a preferred attachment embodying the present invention;

Fig. 2 is a side elevation of the attachment of Fig. 1 in combination with a home electric iron;

Fig. 3 is a cross section taken substantially along the line 3—3 of Fig. 2; and

Fig. 4 is a fragmentary sectional view of a modification of the attachment of Fig. 1.

The illustrated device, generally shown at 20, is designed to be used with a conventional home electric iron, of the type generally shown at 22, in order to provide, for example, a pair of thermoplastic sheets 24 and 26 (Fig. 3) with an elongated narrow seal. The sheets, in one form, are the opposed sections at the end of a thermoplastic bag containing, for example, food to be hermetically sealed and frozen.

As shown, iron 22, in conventional fashion, includes a generally wedge shaped metallic, heat conducting plate 28 presenting a flat lower surface, a similarly shaped housing 30 enclosing a thermostatically controlled heating unit, a heat nonconducting and insulating handle 32, a knob 34 for adjusting the temperature of the heating unit, and a suitable cord 36 for connecting the heating unit to a source of electricity.

As shown, attachment 20 comprises a bed 38 presenting a flat upper surface that receives the lower surface of plate 28 in flush relation, a clamp 40 that securely grips housing 30, and a blade 42 that receives heat from plate 28 by conduction through bed 38. As shown bed 38 and blade 42 are formed from the horizontal and vertical sections, respectively, of extruded integral stock that is T-shaped in cross section. This stock preferably is composed of aluminum or an aluminum alloy for high heat conductivity and low cost. The forward corners 44 and 46 of bed 38 are flanged upwardly and rearwardly to provide rearwardly diverging abutments as a seat for the diverging forward edges of base plate 28 of iron 22. The lower ends of blade 42 are rounded. Clamp 40 (Fig. 3) includes a pair of generally Z-shaped elements having substantially horizontal arms 48, substantially upstanding arms 50 and substantially depending arms 52. Extending along arms 48 into arms 52 are slots 54 which are laterally extended at 56. Arms 48 are slidably supported underneath bed 38 by studs 58, which extend through slots 54. The lower ends of studs 58 are provided with heads 60 which support arms 48 but which can be fitted through laterally extended portions 56 of slots 54. The upper ends of pins 58 are secured to bed 38 through spacers 62 by flush screws 64 which do not interrupt the smooth upper surface of the bed. Upstanding arms 50 are bent somewhat toward each other to snugly grip the sides of iron 22. Extending through an opening 66 is a screw 68 having a thumb piece 72 at one of its extremities. Screw 68 has oppositely threaded end portions of relatively large maximum diameter and a central portion of relatively small diameter. Opening 66 has a relatively large section for receiving one of the end portions of screw 68 and a relatively narrow section for permanently seating the central section of screw 68. The end portions of screw 68 are turned into a pair of internally threaded openings 70 oppositely disposed in depending arms 52. The Z-shaped elements and screw 68 preferably are composed of steel so as to retain their shape under difficult conditions. The tips of flanges 44 and 46 and of upstanding arms 50 are coated with a resilient material 74 that is heat resistant and rubberlike in order to prevent scratching of iron 22.

As shown, the lower edge of blade 42 is covered with a heat resistant stratum 76 which prevents the blade from adhering to or otherwise damaging the thermoplastic sheets. This protective stratum is composed of a material which, in comparison with the thermoplastic of the sheets to be welded, has a high softening or melting point and which will not adhere to the thermoplastic at its welding temperature. In one form, the material of the thermoplastic sheets and the material of the protective stratum are incompatible synthetic plastics, i. e. are synthetic plastics which do not form homogeneous mixtures. Where, for example, the thermoplastic sheets are composed of polyethylene, or of rubber hydrochloride, stratum 76, for example, is composed of tetrafluoroethylene. Alternatively, the heat resistant stratum is not actually coated on blade 42 but is merely associated with it as a barrier to be placed on the thermoplastic sheets to be sealed before the blade is applied.

As shown in Fig. 3, the lower edge of blade 42, which has an overall thickness of approximately one eighth of an inch, is medially flat as at 77 to provide an adequate sealing area and is rounded at its corners as at 78 to prevent cutting at the edges of the seal. Alternatively, as shown in Fig. 4, the lower edge of the blade is medially flat as at 80, rounded at one of its corners as at 82 to prevent cutting at one edge of the seal and sharp at 84 to ensure cutting at the other edge of the seal.

In operation, the pointed forward end of iron 22 is seated between abutments 44 and 46, the lower surface of plate 28 is superimposed on bed 38, and the rearward end of housing 30 is snugly engaged by vertical arms 52 and 54. Iron 22 is then turned on and knob 34 adjusted for a temperature in the vicinity of the melting point of polyethylene or rubber hydrochloride, e. g. a temperature ranging from 200 to 450° F. The area of the upper surface of bed 38 is substantial in relation to the area of the lower surface of plate 28 in order to ensure approximately simultaneous heating of the plate and blade 42. When applied to sheets 24 and 26 for a period ordinarily of from 1 to 5 seconds, blade 42 produces an even elongated seal between the sheets. The width of the lower edge of blade 42 is chosen to apply appropriate pressure under the weight of attachment 20 and iron 22, which are manipulated under the same pressure as is applied by an operator using the iron alone.

Since certain changes may be made in the above device without departing from the scope of the invention herein involved, it is intended that all matter contained in the above description and shown in the accompanying drawing shall be interpreted in an illustrative and not in a limiting sense.

I claim as my invention:

1. In combination with a thermostatically controlled hole electric iron having a generally wedge-shaped heat conducting plate presenting a flat lower surface and a heat insulating handle above the plate, an attachment comprising a heat conducting bed presenting a flat upper surface, a removable clamping means securing said attachment to said iron with said lower surface and said upper surface in flush relation, and a heat conducting blade connected to said bed for applying heat and pressure from the lower edge of said blade through a protective stratum to collocated regions of thermoplastic sheeting in order to weld said regions together, said protective stratum adhering to said lower edge of said blade.

2. An attachment for use with a home electric iron having a generally wedge-shaped body presenting a flat lower surface, said attachment comprising a generally horizontal section presenting a flat upper surface and a generally vertical section depending from said horizontal section, the corners of said horizontal section at one end of said attachment being turned upwardly to provide a pair of rearwardly diverging abutments as a seat for the apex of said body, a pair of clamping arms relatively movable at the other end of said attachment for securing said lower surface to said upper surface, and a heat resistant synthetic plastic covering the lower edge of said vertical section.

3. An attachment for use with a home electric iron having a generally wedge-shaped heat conducting plate presenting a flat lower surface and a heat insulating handle above the plate, said attachment comprising a heat conducting bed presenting a flat upper surface, a removable clamping means for securing said attachment to said iron with said lower surface and said upper surface in flush relation, a heat conducting blade connected to said bed for applying heat and pressure from the lower edge of said blade to collocated regions of thermoplastic sheeting in order to weld said regions together, and a protective synthetic plastic stratum associated with said lower edge of said blade in order to prevent said blade from adhering to said regions.

References Cited in the file of this patent
UNITED STATES PATENTS

| | | |
|---|---|---|
| 1,342,864 | Nikonow | June 8, 1920 |
| 2,299,322 | Harter | Oct. 20, 1942 |
| 2,572,791 | White | Oct. 23, 1951 |
| 2,574,094 | Fener et al. | Nov. 6, 1951 |
| 2,618,729 | Helmbold | Nov. 18, 1952 |